(12) United States Patent
Bocale

(10) Patent No.: US 6,699,300 B1
(45) Date of Patent: Mar. 2, 2004

(54) DEVICE FOR DRYING COMPRESSED AIR

(75) Inventor: Marco Bocale, Rome (IT)

(73) Assignee: Seco Engineering Srl, Aosta (IT)

( * ) Notice: Subject to any disclaimer, the term of this patent is extended or adjusted under 35 U.S.C. 154(b) by 0 days.

(21) Appl. No.: 10/111,543

(22) PCT Filed: Nov. 3, 2000

(86) PCT No.: PCT/IT00/00444
§ 371 (c)(1),
(2), (4) Date: Apr. 24, 2002

(87) PCT Pub. No.: WO01/32295
PCT Pub. Date: May 10, 2001

(30) Foreign Application Priority Data

Nov. 5, 1999 (IT) .................. RM990231 U

(51) Int. Cl.$^7$ .............................................. B01D 45/12
(52) U.S. Cl. ..................... 55/318; 55/319; 55/437; 55/457; 55/DIG. 17; 96/189
(58) Field of Search ................. 55/318, 319, 437, 55/438, 457, DIG. 17; 96/188, 189, 190

(56) References Cited

U.S. PATENT DOCUMENTS

| | | | |
|---|---|---|---|
| 1,774,295 A | 8/1930 | Smallhouse | |
| 2,226,045 A | * 12/1940 | Baldwin | 55/419 |
| 3,507,098 A | * 4/1970 | Veres et al. | 96/409 |
| 3,890,122 A | 6/1975 | Frantz | |
| 4,723,970 A | 2/1988 | Yokoyama | |

* cited by examiner

Primary Examiner—Robert A. Hopkins
(74) Attorney, Agent, or Firm—Samuels, Gauthier & Stevens

(57) ABSTRACT

The invention relates to a device for drying compressed air comprising a substantially cylindrical, innerly hollow, container (19), provided, above, with an inlet hole (2) for the compressed air and with an outlet hole (24) for the compressed air, and at the bottom, with a chamber (21) for collecting condensed air and with means for extracting the same, at least an expansion chamber (3), communicating with said inlet hole (2), at least a laminating flange (4, 5), provided, downward said expansion chamber (3), with holes (6) for the passage of the compressed air, at least a spiral conical expander (10), provided with fins, and an inner canalization (23) for the rising of the compressed dehumidificated air toward the outlet hole.

4 Claims, 2 Drawing Sheets

DEVICE FOR DRYING COMPRESSED AIR

BACKGROUND OF THE INVENTION

1. Field of the Invention

The present invention relates to an improved device for drying compressed air.

More specifically, the invention concerns a device for drying compressed air having modular piloted expansion and lamination with cyclone and centrifugal effect, and with automatic extraction of the condense from the stocking reservoirs.

2. Description of the Prior Art

It is well known that condense must be extracted from compressed air in order to avoid that the same is introduced within the distribution lines, with the consequent damaging of the apparatuses fed by compressed air.

In the past, to eliminate condense from compressed air, drying apparatuses are used, that are placed between the compressor and the compressed air reservoir and/or the use line.

Said drying apparatuses are very complex, bulky and expensive devices.

Therefore, they influence in a very extremely remarkable manner on the implant costs.

Said drying apparatuses are sized in function of the compressor flow rate. The biggest and most expensive apparatuses have a flow rate of about 16–30 m$^3$.

By the Utility model patent application N° RM97U000114, filed on Jun. 2, 1997, it has been suggested a solution able to obviates to the above mentioned problems.

In said patent application described a solution of a device providing a finned element, having spiral. peripheral fins, said fins breaking or cutting the compressed air flow entering within the device, inducing a thermal drop, and thus the water condense contained within the compressed air, water being extracted from the device and air exiting completely dried, as requested and necessary, ready to be used and stocked.

Now, the applicant found that said solution, even having remarkable advantages with respect to the known solutions, still has some drawbacks, making it use not advantageous in any situation.

Therefore, in view of the above, the Applicant has studied and realised an improvement of the device which the subject matter of the present invention, that allows an optimal use in any situation.

Therefore, main object of the present invention is that of eliminating the above mentioned drawbacks, by the realisation of a device carrying out, at the same time, the dehumidification work, the depuration of the compressed air and the automatical extraction from stocking reservoirs. Filters and distribution lines, thus allowing, among other things, the use on board of operating machines requiring compressed air necessarily depurated.

Another advantage of the solution according to the present invention resides in having minimum dimensions and very low costs, up to 30–40 mc/l', and to applicable also in little dimension implants and in implant usually not subjected of not subjectable to said devices (pneumatic circuits for the servo-control of motor vehicles, such as truck, buses, tram, trains, etc.).

Another advantage that can be obtained by the solution according to the present invention consists in the fact that the invention exploits for its very low feeding the same compressed air of the implant not requiring electrical feeding and thus explosion-proof.

A further advantage of the apparatus according to the present invention is that of exploiting an operating principle different with respect to the one used by the known systems, thus being possible to avoid the needing of any motor member, that is subjected to wearing, deterioration, or clogging.

SUMMARY OF THE INVENTION

It is therefore specific object of the present invention a device for drying compressed air comprising a substantially cylindrical, innerly hollow, container, provided, above, with an outlet hole for the compressed air and with an outlet hole for the compressed air, and at the bottom, with a chamber for collecting condensed air and with means for extracting the same, at least an expansion chamber, communicating with said inlet hole, at least a laminating flange, provided, downward said expansion chamber, with holes for the passage of the compressed air, at least a spiral conical expander, provided with fins, and an inner canalisation for the rising of the compressed dehumidified air toward the outlet hole.

Preferably, according to the invention, said at least one laminating flange is comprised of two adjustable laminating flange, provided with oval holes that, during their adjusting each other, modify the passage of the compressed air, adapting the same to the specific needings.

Still according to the invention, downward said conical finned expander, one or more series of element can be provided, each series being comprised of expansion chamber, laminating flange, finned conical spiral expander.

Furthermore, according to the invention, downward said at least one laminating flange a fan can be provided.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE PREFERRED EMBODIMENT

Figure 1:
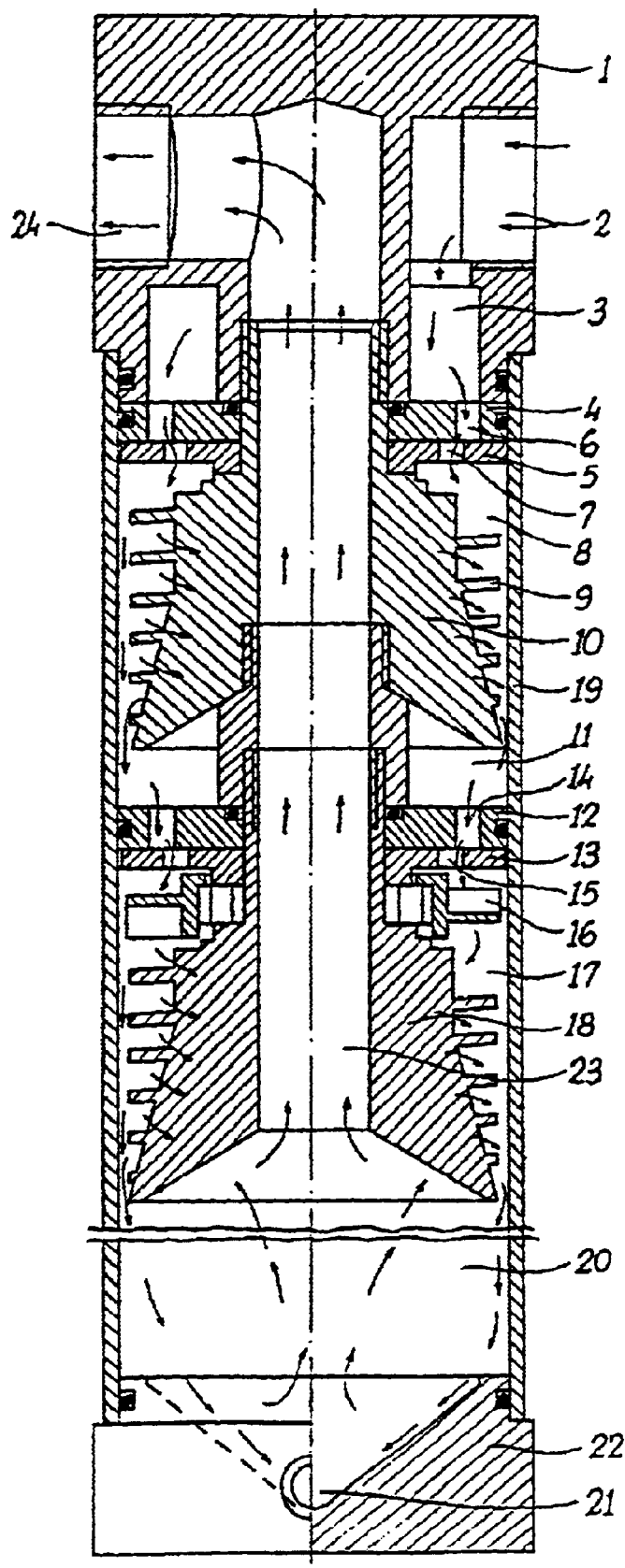
FIG. 1 is a section view of the device according to the invention.

Referring first to the FIG. 1 of the drawings, it is shown a drying device according to the invention, providing a head 1, having a threaded hole 2, realising the inlet of the compressed air, taken from a mot-compressor, from the stoking reservoir or from the distribution lines and to be treated.

A first expansion chamber 3 is realised by the insertion of hermetic sealing laminating flanges 4, 5.

Said flanges 4, 5 are provided with air passages 6, 7, the oval shape and dimension of which can be adjusted, in function of the necessary heads ranging from 0.5 mc/1' to 30–40 mc/1', by the rotation each other of flanges 4, 5.

The passage of compressed air through said holes 6, 7 creates the first lamination cycle, with a cooling effect due to the increase of the speed of the compressed air passage expanding within the chamber 8.

After the expansion, compressed air in channelled through the spire 9 of the expander 10, thus creating a cyclone effect, and further separating the condense due to the centrifugal effect shock.

Afterwards, compressed air expands again within the chamber 11, within which it is subjected to a further lamination by the further flanges 12, 13, having the same features of flanges 4, 5, including also the oval shaped holes 14, 15.

In the following passage, compressed air meets the centrifugation blades 16, creating a centrifugation and expansion condition within the chamber 17, thus increasing the shock effect and the cyclone effect by the expander 18, that, for its conicity, allows the passage of the compressed air.

Particularly, it is obtained the expansion toward the wall of the outer cylinder 19 of the device according to the invention, of the condense and of the oil and solid particle residuals, that are thrust toward the expansion chamber 20 and accumulated in the lower part 21 of the lower head 22, before being ejected.

Compressed air crossing the chamber 20, separated by extraneous bodies due to the conicity of the lower part 21 of the head 22. Conicity of this part cuts down turbolences, conveying compressed air through the canalisation 23 up to the outlet hole 24, that is connected to the implant.

Liner or cylinder 19 of the drying device, the upper head 1 and the lower head 22 enclose the assembly of the apparatus by tie rods.

Figure 2:
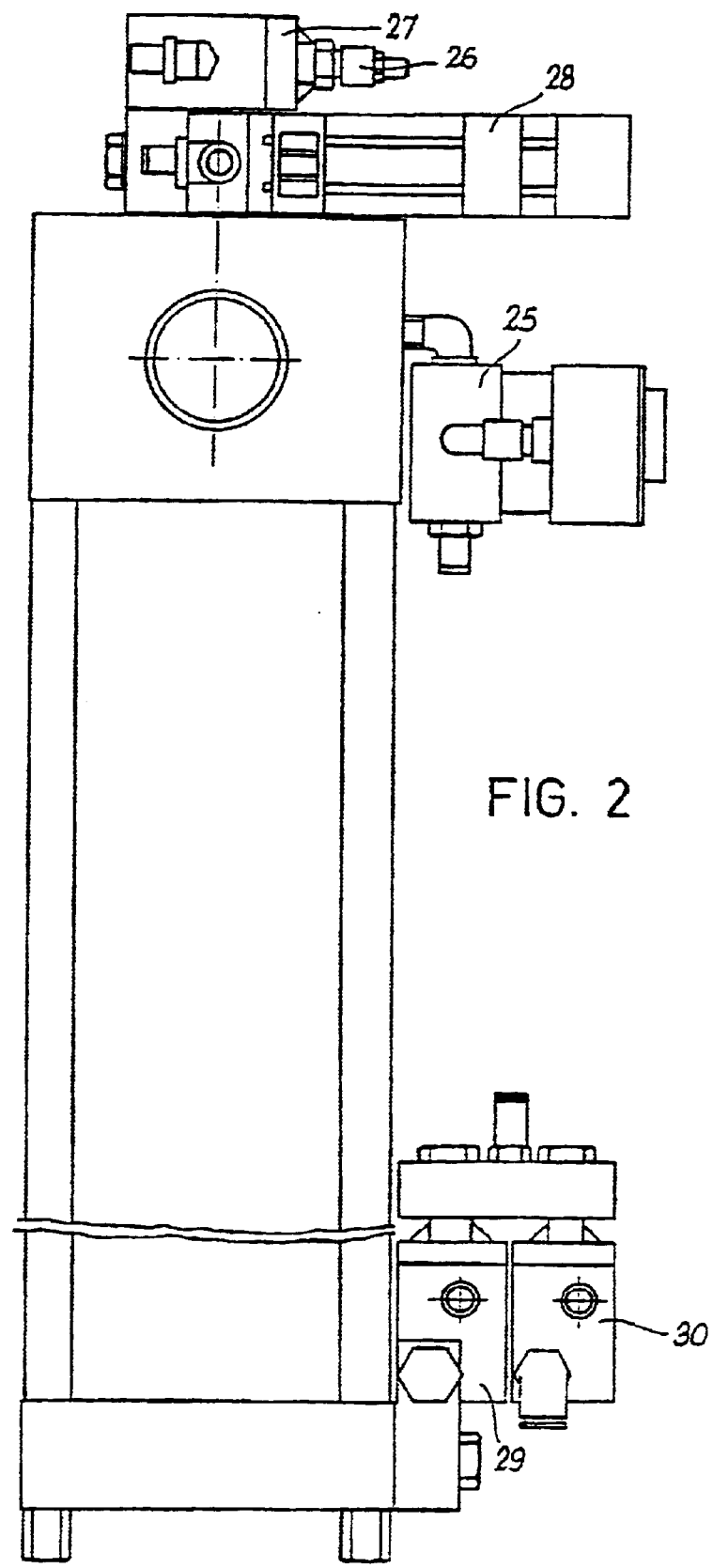
FIG. 2 is a lateral view of the device of FIG. 1.

Coming now to observe FIG. 2 of the drawings, it is shown the assembly of the pneumatic servo-control.

Particularly, by the pressure reduction unit and manometer 25 a micro amount of depurated air is taken from the head 1 and conveyed to a flow regulator 26, feeding the three way pneumatic valve 27.

Said three way valve 27 feeds the timer 28 determining the discharge cycles (ranging from 1 cycle every 2 minutes to 1 cycle for each second) of the three way pneumatic valves 29 and 30.

By the flow regulator can be determined at the same time the opening duration of the condense discharges that are realised through the valves 29 and 30.

Said valves 29, 39 intervene, respectively, valve 29 for the discharge of the condense and of the residuals accumulated in the lower head 22 and the valve 30 for the discharge from the stocking reservoir and/or possible filters provided in the implant.

Flexibility of the adjustments, that are pneumatically controlled, allows the best use of the required flow rates and the necessary discharges.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Device for drying compressed air, comprising a substantially cylindrical, innerly hollow, container, provided, above with an inlet hole for the compressed air and with an outlet hole for the dried compressed air, and at the bottom, with a chamber for collecting condensed air and with means for extracting the same, at least one expansion chamber, communicating with said inlet hole, at least one laminating flange, provided, downstream from said expansion chamber, with holes for the passage of the compressed air, at least one spiral conical expander, provided with a spire, and an inner canalisation for the rising of the compressed dehumidificated air toward the outlet hole.

2. Device for drying compressed air according to claim 1, wherein said at least one laminating flange is comprised of two adjustable laminating flanges, provided with oval holes wherein the two adjustable laminating flanges, and hence the locations of the oval holes, are adjustable, and wherein the passage of the compressed air through the oval holes is modified due to the adjustment of the flanges, modify the passage of the compressed air.

3. Device for drying compressed air according to claim 1, wherein downstream from said conical finned expander, one or more series of elements is provided, each series being comprised of expansion chamber, laminating flange, and finned conical spiral expander.

4. Device for drying compressed air according to claim 1, wherein downstream from said at least one laminating flange a fan is provided.

* * * * *